Patented Oct. 31, 1933

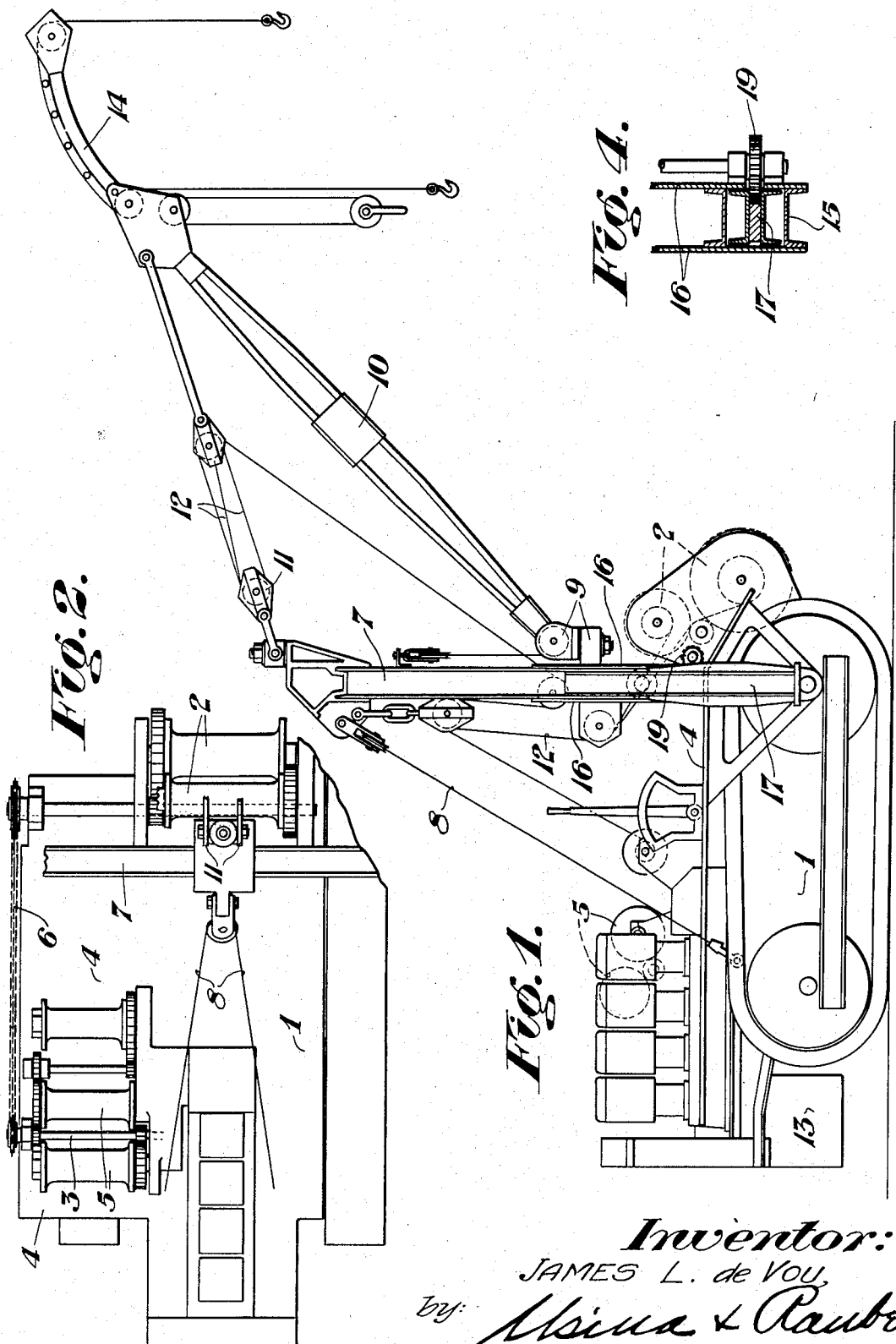

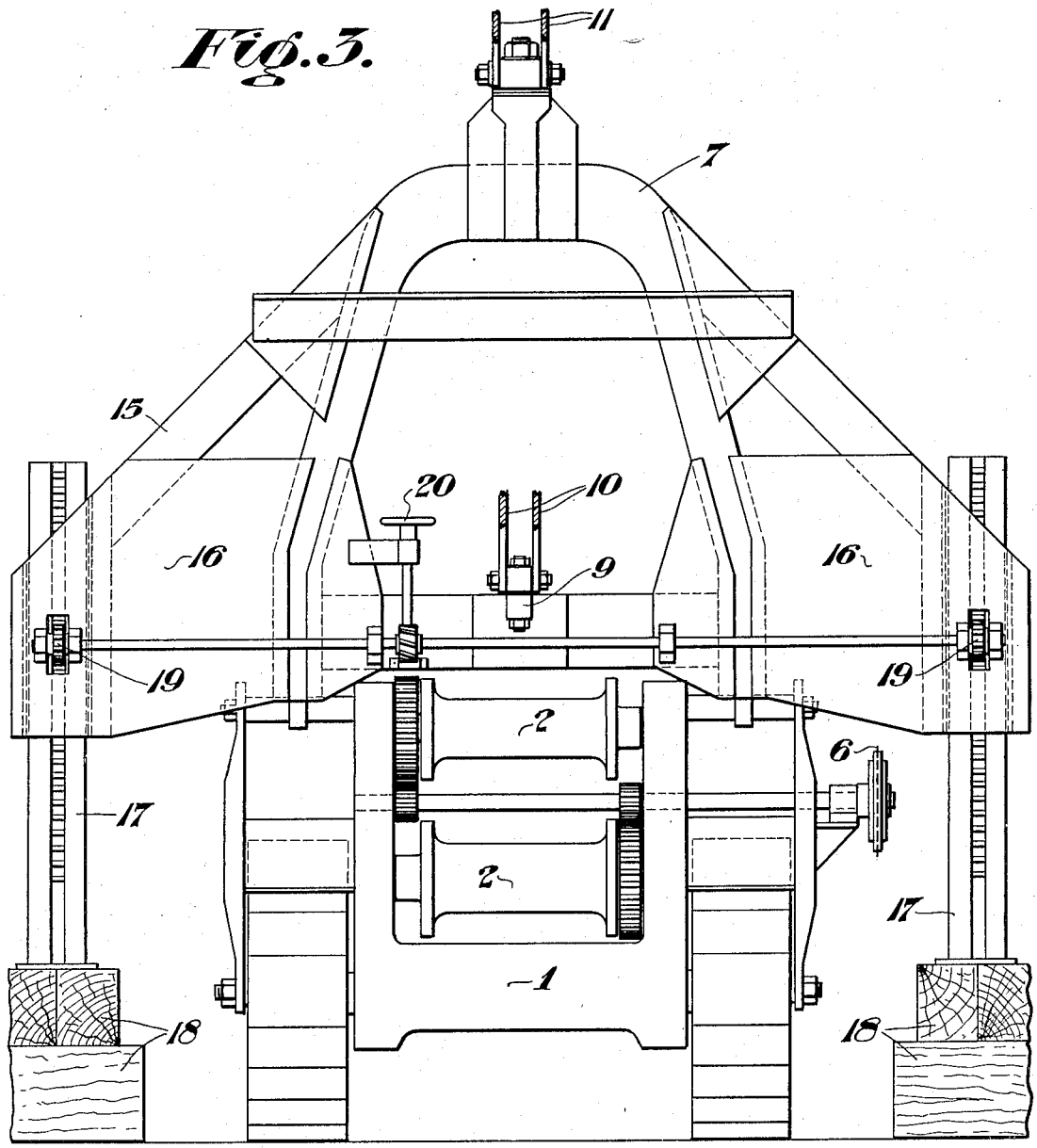

1,933,472

UNITED STATES PATENT OFFICE 1,933,472

TRACTOR DERRICK COMBINATION

James L. de Vou, Pittsburgh, Pa.

Application March 19, 1932. Serial No. 600,035

1 Claim. (Cl. 254—166)

This invention relates to tractor derrick combinations, one of the objects being to produce a mobile unit which may be used as an unloading, erecting and handling rig for industrial and constructional purposes. Other objects will be understood from the following disclosure.

Having reference to the accompanying drawings, which illustrate a specific form of the combination:

Figure 1 is a side elevation.
Figure 2 is a top plan.
Figure 3 is an enlarged end elevation.
Figure 4 is a cross-sectional detail.

In detail, these drawings show a tractor 1 having a plurality of driven cable-drums 2 on one end and a power take-off 3 on one side. A shelf 4 is fixed on the take-off side of the tractor and carries a plurality of cable-drums 5 which are driven by the take-off 3 through suitable gearing. These drums are geared together and are preferably arranged with the conventional clutching and braking mechanisms. The cable-drum 2 may be driven from the power take-off 3 by a chain 6.

An inverted yoke-shaped mast 7 is fixed to the driven cable-drum end of the tractor and braced in position by stays 8 which extend from its top to the other end of the tractor. A universal joint 9 carried adjacent the center line of the mast 7 positions a boom 10. A universally mounted sheave 11 is fixed at the top of the mast 7 and cables 12 are arranged between it, the top of the mast 7 and the driven drums 2. Preferably, the operating levers for the clutches of all the drums mentioned are arranged at a common point to facilitate operation of the combination.

A counterweight 13 is fixed to the frame of the tractor to prevent its tilting forward when lifting a load. A curved extension 14 may be bolted to the end of the boom 10 for handling light loads through greater distances than this boom can ordinarily accommodate.

Outriggers 15 are fixed to the top of the mast 7, and heavy arms 16 extend out from the sides of the tractor. Telescoping members 17 depend from the arms 16 so that blocking 18 may be inserted beneath them to steady the tractor sidewise. These telescoping members 17 may be operated by a rack-and-pinion gearing 19 operated by a hand-wheel 20 connected through suitable gearing.

When this tractor unit is used for industrial and constructional operations pertaining to hoisting, handling, erecting, hauling and unloading, the one machine accomplishes these several different operations without the aid of variously scattered units. In addition, its extreme mobility insures that it can be quickly moved to wherever it is needed.

Although a specific form of this apparatus has been shown and described in accordance with the patent statutes, it is not intended to limit the scope of the invention exactly thereto, except as defined by the following claim.

I claim:

The combination of a tractor having a power take-off on one side, a shelf carried by said tractor adjacent its take-off, one or more cable drums arranged on said shelf and parallel said power take-off, and gears constructed and arranged to interconnect said take-off and said drum or drums, said tractor also carrying one or more drums at one of its ends, hoisting apparatus operated by said last named drums, and means for driving said last named drums by said power take-off.

JAMES L. DE VOU.